No. 608,493. Patented Aug. 2, 1898.
T. E. TROUTT.
ANIMAL TRAP.
(Application filed Feb. 9, 1898.)

(No Model.)

Witnesses
A. Roy Appleman
H. J. Riley

Thomas E. Troutt, Inventor.
By his Attorneys,
C. A. Snow & Co.

THE NORRIS PETERS CO., PHOTO-LITHO., WASHINGTON, D. C.

UNITED STATES PATENT OFFICE.

THOMAS E. TROUTT, OF HOPEWELL, MISSOURI.

ANIMAL-TRAP.

SPECIFICATION forming part of Letters Patent No. 608,493, dated August 2, 1898.

Application filed February 9, 1898. Serial No. 669,672. (No model.)

*To all whom it may concern:*

Be it known that I, THOMAS E. TROUTT, a citizen of the United States, residing at Hopewell, in the county of Washington and State of Missouri, have invented a new and useful Animal-Trap, of which the following is a specification.

The invention relates to improvements in animal-traps.

The object of the present invention is to improve the construction of animal-traps and to provide a simple, inexpensive, and efficient one designed especially for burrowing animals and capable of impaling the same.

The invention consists in the construction and novel combination and arrangement of parts, as hereinafter fully described, illustrated in the accompanying drawings, and pointed out in the claims hereto appended.

Figure 1:
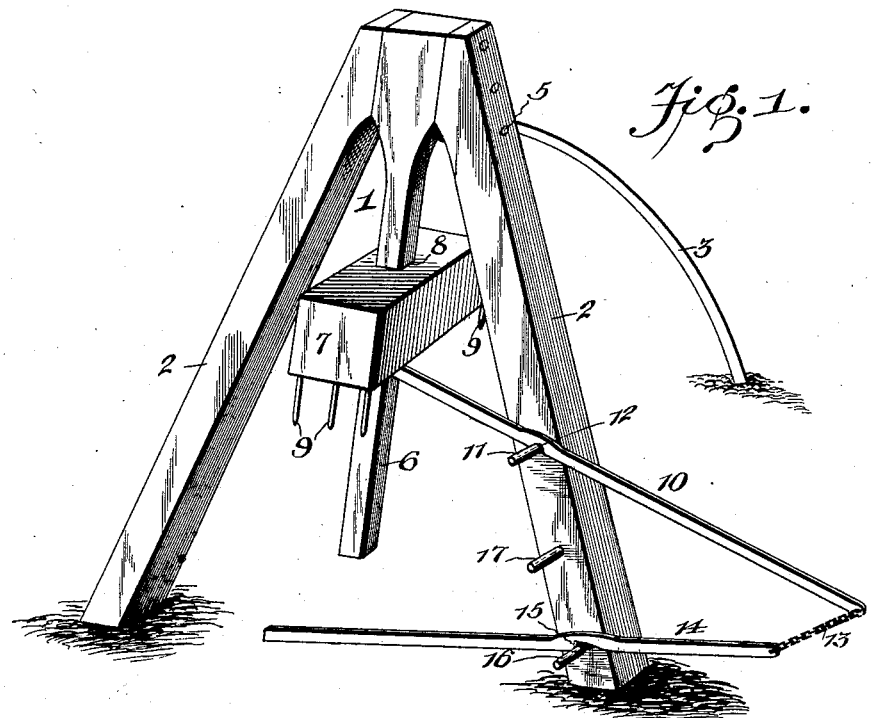
Figure 2:
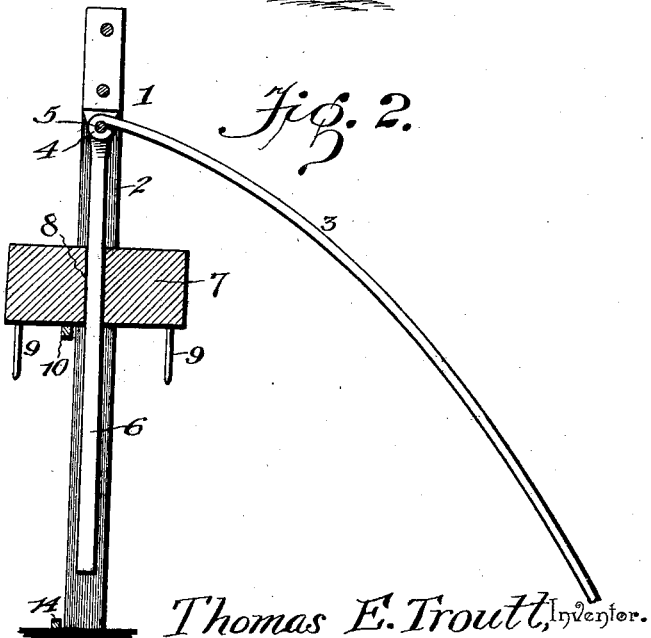

In the drawings, Figure 1 is a perspective view of an animal-trap constructed in accordance with this invention. Fig. 2 is a longitudinal sectional view.

Like numerals of reference designate corresponding parts in both figures of the drawings.

1 designates a supporting-frame consisting of a tripod and comprising front inclined bars or standards 2 and a rearwardly-inclined brace 3, consisting of a rod provided at its upper end with an eye 4, hinged to the bars or standards 2 by a fastening device 5, located near the top of the supporting-frame. By adjusting the hinged brace the supporting-frame may be readily mounted in proper position.

The supporting-frame is provided with a vertical guide-bar 6, depending from the apex of the tripod and secured at its upper end between the upper ends of the inclined bars or standards 2, which form the sides of the frame. The guide-bar receives a gravity-block 7, which is provided with an opening 8 and which has depending spikes or pins 9, adapted to penetrate the earth and impale a mole or other animal. The opening 8 is of sufficient size to permit the gravity-block to slide freely and to fall with full force when the trap is sprung.

The gravity-block is supported in an elevated position by an inclined lever 10, loosely fulcrumed on a supporting-pin 11 of one of the bars or standards 2 and extending upward beneath the block, as clearly shown in the drawings. The lever 10 is provided with a notch 12 to receive the fulcruming-pin 11, and its lower end is loosely connected by a chain 13 or other flexible connection with the outer end of a trigger 14. The trigger 14, which is provided between its ends with a shoulder 15 for engaging a pin or projection 16 of the supporting-frame, has its inner end resting upon the ground and is designed to be arranged directly over a mole-run. The ground receiving the trigger is previously pressed down slightly with the foot, so that an animal passing through the run will raise the earth slightly and trip the trap. The trigger when set for moles is arranged upon the projection or pin 16; but in setting the trap for squirrels or other animals larger than moles the trigger is preferably engaged with a pin or projection 17, located at a point between the pins or projections 11 and 16, and when in engagement with the pin or projection 16 the trigger is arranged beneath the same.

The invention has the following advantages: The trap is simple and comparatively inexpensive in construction, it is positive and reliable in operation, and it is adapted for catching moles, rabbits, and various other burrowing animals, and the trigger may be supplied with a bait for catching various other animals. The trap is exceedingly sensitive, and the trigger may be arranged at different elevations to adapt it for various animals.

Changes in the form, proportion, and minor details of construction may be resorted to without departing from the spirit or sacrificing any of the advantages of this invention.

What I claim is—

1. An animal-trap, comprising a frame composed of oppositely-inclined sides connected at their upper ends, a depending guide-bar secured at its upper end between the upper terminals of the sides, and a rearwardly-extending brace hinged at its upper end between one side of the frame and the guide-bar, a vertically-movable block having impaling means, pins or projections mounted on the frame at one side thereof, a lever loosely fulcrumed on one of the pins or projections and having its inner portion supporting the block, a trigger provided with a shoulder for engaging a pin or projection of the frame, and a flexible connection between the outer ends of the trigger and the lever, substantially as described.

2. An animal-trap, comprising a frame provided with the pins 11 and 16, and the pin 17 disposed at a point between the said pins, a vertically-movable block having impaling means, a trigger provided with a shoulder adapted to engage the pin 16 at the upper side and the pin 17 at the lower side, a lever fulcrumed on the pin 11 and having its inner portion supporting the block, and a flexible connection between the outer ends of the trigger and the lever, said flexible connections being adapted to permit the trigger to be turned to bring its shoulder in engagement with either of the pins 16 or 17, substantially as described.

3. An animal-trap comprising a frame provided with pins or projections, a vertically-movable block having impaling means, a lever loosely fulcrumed on one of the pins or projections and having its inner portion supporting the block, a trigger provided with a shoulder for engaging a pin or projection of the frame, and a flexible connection between the outer ends of the trigger and the lever, substantially as described.

In testimony that I claim the foregoing as my own I have hereto affixed my signature in the presence of two witnesses.

THOMAS E. TROUTT.

Witnesses:
E. M. DEARING,
JAMES R. WHITEHEAD.